United States Patent Office 3,493,047
Patented Feb. 3, 1970

3,493,047
SULFONATE TO HYDROCARBON RATIO INFLUENCING THERMOSTABILITY OF MICELLAR DISPERSIONS
John A. Davis, Jr., and William J. Kunzman, Littleton, Colo., assignors to Marathon Oil Company, Findlay, Ohio, a corporation of Ohio
No Drawing. Filed July 22, 1968, Ser. No. 746,282
Int. Cl. E21b 47/06, 43/22
U.S. Cl. 166—252                16 Claims

ABSTRACT OF THE DISCLOSURE

Thermostability of micellar dispersions containing hydrocarbon, aqueous medium, and surfactant can be shifted to higher temperatures by increasing the ratio of surfactant to hydrocarbon within the micellar dispersion. Such dispersions are useful to recover crude oil in a tertiary oil recovery process wherein the temperature of the subterranean formation is as high as 200° F. or more. For example, a subterranean formation at a temperature above about 80° F. can be flooded by designing the surfactant to hydrocarbon ratio within the micellar dispersion to be stable at the temperature of the formation.

BACKGROUND OF THE INVENTION

United States Patent No. 3,254,714 to Gogarty et al. teaches the use of microemulsion in flooding subterranean formations to recover crude oil. Micellar dispersions, e.g. microemulsions, are differentiated from emulsions in that the former are thermodynamically stable and are generally transparent whereas emulsions are not thermodynamically stable and are generally opaque. In some cases, a micellar dispersion can exhibit emulsion characteristics due to a temperature change.

It is generally accepted within the petroleum industry that the normal subsurface temperature gradient is about 1° F. per 60 feet. Thus, at reservoir depths of about 4,000 feet, temperatures up to and above about 150° F. can be encountered. To effect an efficient flooding operation with a micellar dispersion, the micellar dispersion is preferably designed to be stable at the temperature of the formation.

Applicants have discovered that a mixture of micellar dispersion constituents composed of hydrocarbon, water, and surfactant can be designed to be stable at the formation temperature by increasing the ratio of surfactant to hydrocarbon to impart thermostability to the mixture at the formation temperature. The term "thermostability" as used herein means thermodynamically stable, i.e. a system below or above the thermostability temperature range will exhibit two or more distinct layers or phases, indicating an unstable system or an emulsion.

DESCRIPTION OF THE INVENTION

The term "micellar dispersion" as used herein is meant to include "microemulsion" [Schulman and Montagne, Annals of the New York Academy of Sciences, 92, pp. 366–371 (1961)], oleopathic hydro-micelles [Hoar and Schulman, Nature, 152, p. 102 (1943)], "transparent" emulsions (Blair, Jr., et al., United States Patent No. 2,356,205), micellar technology taught in C. G. Summer, Clayton's, The Theory of Emulsions and Their Technical Treatment, 5th edition, pp. 315–320 (1954) and micellar solutions, examples of the latter being defined in United States Patent Nos. 3,254,714; 3,275,075; 3,301,325; and 3,307,628.

The micellar dispersions are composed of hydrocarbon, aqueous medium and surfactant. Examples of volume amount include 4–60% and more of hydrocarbon, 20–90% aqueous medium and at least about 4% surfactant. Cosurfactant and electrolyte can also be incorporated within the micellar dispersion. These dispersions can be oil external or water external.

Examples of hydrocarbon include crude oil (both sweet and sour), partially refined fractions of crude oil and refined fractions thereof, e.g. side cuts from crude oil columns, crude column overheads, straight-run gasoline, and liquefied petroleum gases. Preferably, the hydrocarbon is crude oil or partially refined fractions thereof.

The aqueous medium can be soft water, brackish water or a brine. Preferably, the water is soft but it can contain small amounts of salts which are characteristic of the subterranean formations being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine sterate, hexadecyl trimethyl ammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X-100 (an alkylphenoxy polyethoxy ethanol marketed by Rohm & Haas, Philadelphia, Pennsylvania) and Arquad 12-50 (a 50% active dodecyl trimethyl ammonium chloride marketed by Armour Chemical Company, Chicago, Illinois), and like materials.

Preferably, the surfactant is a petroleum sulfonate, also known as alkyl aryl naphthenic sulfonate, and preferably containing an alkali cation. Examples of preferred surfactants are the sodium and ammonium petroleum sulfonates having an average molecular weight of from about 360 to about 520, and more preferably from about 420 to about 470. The surfactant can be a mixture of low and high molecular weight sulfonates or a mixture of two or more different surfactants.

The cosurfactants are also known as semi-polar organic compounds or cosolubilizers. Examples of cosurfactants include alcohols, amino compounds, esters, aldehydes and ketones containing from 1 to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and primary and secondary hexanols. Concentrations of from about 0.01% to about 20% by volume of cosurfactant are useful in the micellar dispersion and more preferably from about 0.1 to about 5.0%. Mixtures of two or more cosurfactants are useful.

Examples of useful electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in United States Patent No. 3,330,343. Generally from about 0.001% to about 5% or more by weight (based on the aqueous medium) of electrolyte is useful. The electrolyte can be the salts within brackish or brine water.

The mobility of the micellar dispersion is desirably about equal to or less than the mobility of the formation fluids in the reservoir (i.e. combination of crude oil and interstitial water) ahead of the dispersion. Preferably, the micellar solution has a mobility favorable to protecting against viscous instability.

Size of the micellar dispersion slug useful with this invention is from about 1% to about 20% formation pore volume. Larger pore volumes are useful but such may be economically unattractive. More preferably, from about 2% to about 10% formation pore volumes are useful and from about 3% to about 6% formation pore volumes give very efficient results.

The micellar dispersion is designed to be thermally stable at the temperature of the formation by adjusting the surfactant to hydrocarbon ratio. The particular ratio at which thermostability at formation temperature is obtained will depend upon the particular hydrocarbon, surfactant, cosurfactant, and amount of electrolyte within the micellar dispersion. The other components within the micellar dispersion may impart some influence on the thermostability of the dispersion. However, increasing the ratio of surfactant to hydrocarbon is the objective of this invention to shift the thermostability of the dispersion to higher temperatures.

The particular ratio of surfactant to hydrocarbon needed to stabilize the mixture of stabilizable micellar dispersion constituents can be determined by first obtaining the temperature of the reservoir and then increasing the ratio of surfactant to hydrocarbon within the particular mixture to give a micellar dispersion stable at the formation temperature.

Where the formation temperature substantially exceeds ambient temperature, it is possible that a micellar dispersion designed to be stable at the formation temperature may not be stable at the ambient temperature. The constituents within the micellar dispersion are generally designed after the particular reservoir to be flooded, i.e. the overall characteristics of the dispersion are particular to the reservoir.

The following examples are presented to illustrate working embodiments of the invention. Such examples are not to be interpreted as limiting the invention. Rather, equivalents known to those skilled in the art are to be interpreted within the invention as defined in the specification and appended claims. Where percents are used, they are based on volume unless otherwise specified.

EXAMPLE 1

Six micellar dispersion samples (two each in systems A, B, and C; the significant difference in each system is the ratio of surfacant to hydrocarbon) indicated in Table I are tested for thermostability temperature range. Compositions of the dispersions are indicated in Table I:

TABLE I.—MICELLAR DISPERSION COMPOSITIONS

| Component | Systems A | | Systems B | | Systems C | |
|---|---|---|---|---|---|---|
| | 1 | 2 | 1 | 2 | 1 | 2 |
| Water | 34.5 | 34.5 | 34.5 | 34.5 | 34.5 | 34.5 |
| Isopropanol | 4.2 | 4.2 | 4.2 | 4.2 | 4.2 | 4.2 |
| Straight-run gasoline | 53.9 | 52.7 | 53.9 | 52.7 | 53.9 | 52.7 |
| Surfactant (sodium petroleum sulfonate, avg. MW=470, about 62% active sulfonate) | 7.4 | 8.6 | 7.4 | 8.6 | 7.4 | 8.6 |
| $Na_2SO_4$ (weight percent based on active surfactant) | 3 | 3 | 6 | 6 | 9 | 9 |
| Surfactant to hydrocarbon ratio | 0.137 | 0.163 | 0.137 | 0.163 | 0.137 | 0.163 |
| Thermostability: | | | | | | |
| (a) lower temperature limit (°F.) | 70 | 88 | 90 | 136 | 160 | 200 |
| (b) upper temperature limit (°F.) | 89 | 105 | 109 | 168 | | |

Data in Table I indicate that for systems A, as the ratio of surfactant to hydrocarbon increases, so does the lower and upper thermostability temperature range. This is, system A-1, having a surfactant to hydrocarbon ratio of 0.137 has a single phase thermostability range of 70° F.–89° F., but when the surfactant to hydrocarbon ratio is increased to 0.163 the single phase thermostability range increases to 88° F.–105° F. Systems B are similar to systems A except they contain a larger amount of electrolyte, i.e. sodium sulfate, and the single phase thermostability range for a surfactant to hydrocarbon ratio of 0.137 is 90° F.–109° F. and for a surfactant to hydrocarbon ratio of 0.163 the range is 136° F.–168° F. Systems C indicate that a two-phase system (thermodynamically unstable or emulsion characteristics) occurs at a surfactant to hydrocarbon ratio below 0.137 (at temperatures below 160° F.) but at a surfactant to hydrocarbon ratio of 0.163, the minimum lower temperature limit of the thermostability range is increased to 200° F.

EXAMPLE 2

Three different micellar dispersions are obtained by mixing components at ambient temperature. The kerosene and sulfonate are first blended together and then mixed with the water and sodium sulfate and then the alcohol is added. Compositions of the micellar dispersions are indicated in Table II:

TABLE II

| Component | Micellar dispersion | | |
|---|---|---|---|
| | D | E | F |
| Kerosene | 58.5 | 57.2 | 55.9 |
| Sodium Sulfonate (avg. MW=470, about 62% active) | 8.0 | 9.3 | 10.6 |
| Isopropanol | 3.5 | 3.5 | 3.5 |
| Distilled water | 30.0 | 30.0 | 30.0 |
| Sulfonate to kerosene ratio | 0.136 | 0.162 | 0.190 |
| $Na_2SO_4$ (weight based 100 cc. of dispersion) (gms.) | 0.20 | 0.20 | 0.20 |

The above micellar dispersions are tested for thermostability and found to have the thermostability ranges outlined in Table III:

TABLE III

| Micellar dispersion | Thermostability range (° F.) | |
|---|---|---|
| | Lower temperature limit | Upper temperature limit |
| D | 74 | 92 |
| E | 74 | 109 |
| F | 74 | 118 |

EXAMPLE 3

Three micellar dispersions are obtained similar to those in Example 2; straight-run gasoline is used in place of kerosene. The components within the micellar dispersions are outlined in Table IV:

TABLE IV

| Component | Micellar dispersion | | |
|---|---|---|---|
| | G | H | I |
| Straight-run gasoline | 56.3 | 55.05 | 53.8 |
| Sodium sulfonate (avg. MW=470, about 62% active) | 7.7 | 8.95 | 10.2 |
| Isopropanol | 4.0 | 4.0 | 4.0 |
| Distilled water | 32.0 | 32.0 | 32.0 |
| $Na_2SO_4$ (based on 100 cc. of dispersion) (gms.) | 0.195 | 0.195 | 0.195 |
| Sulfonate to gasoline ratio | 0.136 | 0.162 | 0.190 |

The above micellar dispersions are tested for thermostability and found to have the thermostability ranges outlined in Table V:

TABLE V

| Micellar dispersion | Thermostability range (° F.) | |
|---|---|---|
| | Lower temperature limit | Upper temperature limit |
| G | 111 | 140 |
| H | 111 | 159 |
| I | 111 | 193 |

At temperatures below the "Lower Temperature Limit" and above the "Upper Temperature Limit" the fluids separate into two or more distinct layers or phases, indicating an unstable system or an emulsion.

What is claimed is:

1. A process of recovering crude oil from oil-bearing subterranean formations having at least one production means and at least one injection means in fluid communication therewith, comprising determining the temperature of the formation,
   (1) injecting into the formation a stabilizable mixture of micellar dispersion constituents comprised of hydrocarbon, surfactant, and aqueous medium characterized in that the ratio of surfactant to hydrocarbon is increased sufficiently to stabilize the mixture as a micellar dispersion at the formation temperature,
   (2) displacing the dispersion through the formation, and
   (3) recovering crude oil through the production means.
2. The process of claim 1 wherein the stabilizable mixture of micellar dispersion contains cosurfactant.
3. The process of claim 1 wherein the stabilizable mixture of micellar dispersion contains electrolyte.
4. The process of claim 1 wherein the formation temperature is in excess of 80° F.
5. The process of claim 1 wherein the formation temperature is in excess of about 150° F.
6. The process of claim 1 wherein the formation temperature is in excess of about 200° F.
7. The process of claim 1 wherein the surfactant is petroleum sulfonate.
8. A process of recovering crude oil from an oil-bearing subterranean formation having at least one production means and at least one injection means in fluid communication therewith, comprising determining the temperature of the formation to be in excess of about 80° F.,
   (1) injecting into the formation a stabilizable mixture of micellar dispersion constituents comprised of hydrocarbon, petroleum sulfonate, and aqueous medium characterized in that the ratio of petroleum sulfonate to hydrocarbon is increased sufficiently to stabilize the mixture as a micellar dispersion at the formation temperature,
   (2) displacing the dispersion through the formation, and,
   (3) recovering crude oil through the production means.
9. The process of claim 8 wherein the temperature of the formation is in excess of about 150° F.
10. The process of claim 8 wherein the mixture of micellar dispersion constituents contains cosurfactant.
11. The process of claim 8 wherein the mixture of micellar dispersion constituents contains electrolyte.
12. A process of stabilizing a mixture of micellar dispersion constituents comprised of hydrocarbon, surfactant, and aqueous medium at a temperature in excess of about 80° F., comprising increasing the ratio of surfactant to hydrocarbon to stabilize the mixture as a micellar dispersion at that temperature.
13. The process of claim 12 wherein the mixture of micellar dispersion constituents contains cosurfactant.
14. The process of claim 13 wherein the cosurfactant is alcohol.
15. The process of claim 12 wherein the mixture of micellar dispersion constituents contains electrolyte.
16. The process of claim 12 wherein the temperature is in excess of about 150° F.

References Cited

UNITED STATES PATENTS

| | | | |
|---|---|---|---|
| 3,041,275 | 6/1962 | Lummus et al. | 252—309 X |
| 3,170,514 | 2/1965 | Harvey et al. | 166—275 |
| 3,234,143 | 2/1966 | Waldmann | 252—309 |
| 3,244,638 | 4/1966 | Foley et al. | 252—8.5 X |
| 3,254,714 | 6/1966 | Gogarty et al. | 166—274 |
| 3,266,570 | 8/1966 | Gogarty | 166—273 |
| 3,275,075 | 9/1966 | Gogarty et al. | 166—274 |
| 3,297,084 | 1/1967 | Gogarty et al. | 166—274 X |
| 3,330,343 | 7/1967 | Tosch et al. | 166—274 X |
| 3,348,611 | 10/1967 | Reisberg | 166—274 X |
| 3,373,809 | 3/1968 | Cooke | 166—274 X |

STEPHEN J. NOVOSAD, Primary Examiner

U.S. Cl. X.R.

166—275